D. W. BRUNTON.
APPARATUS FOR LOCATING SNIPERS AND FOR OTHER PURPOSES.
APPLICATION FILED SEPT. 14, 1917.
1,308,474.
Patented July 1, 1919.
3 SHEETS—SHEET 1.
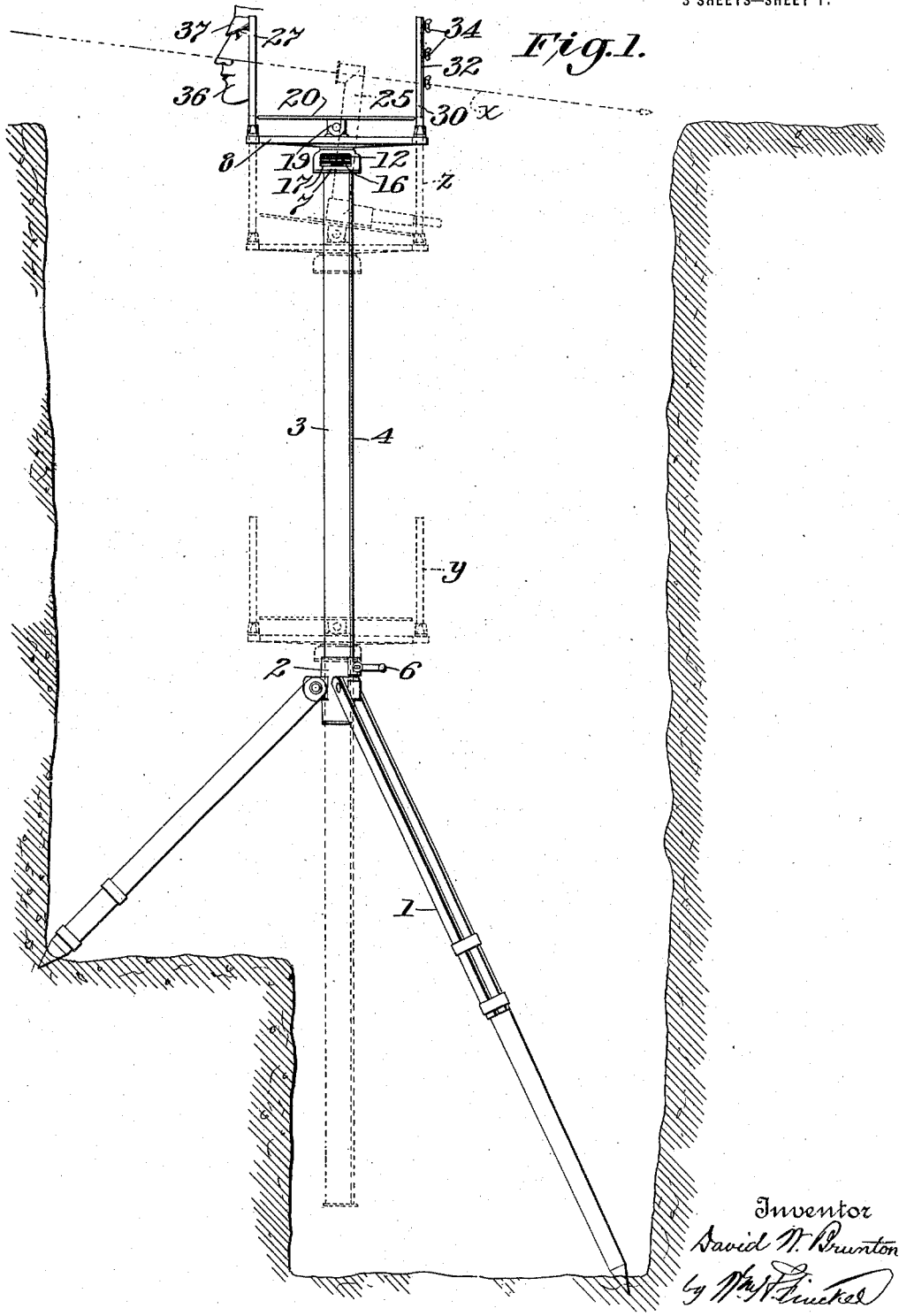

D. W. BRUNTON.
APPARATUS FOR LOCATING SNIPERS AND FOR OTHER PURPOSES.
APPLICATION FILED SEPT. 14, 1917.
1,308,474.
Patented July 1, 1919.
3 SHEETS—SHEET 2.
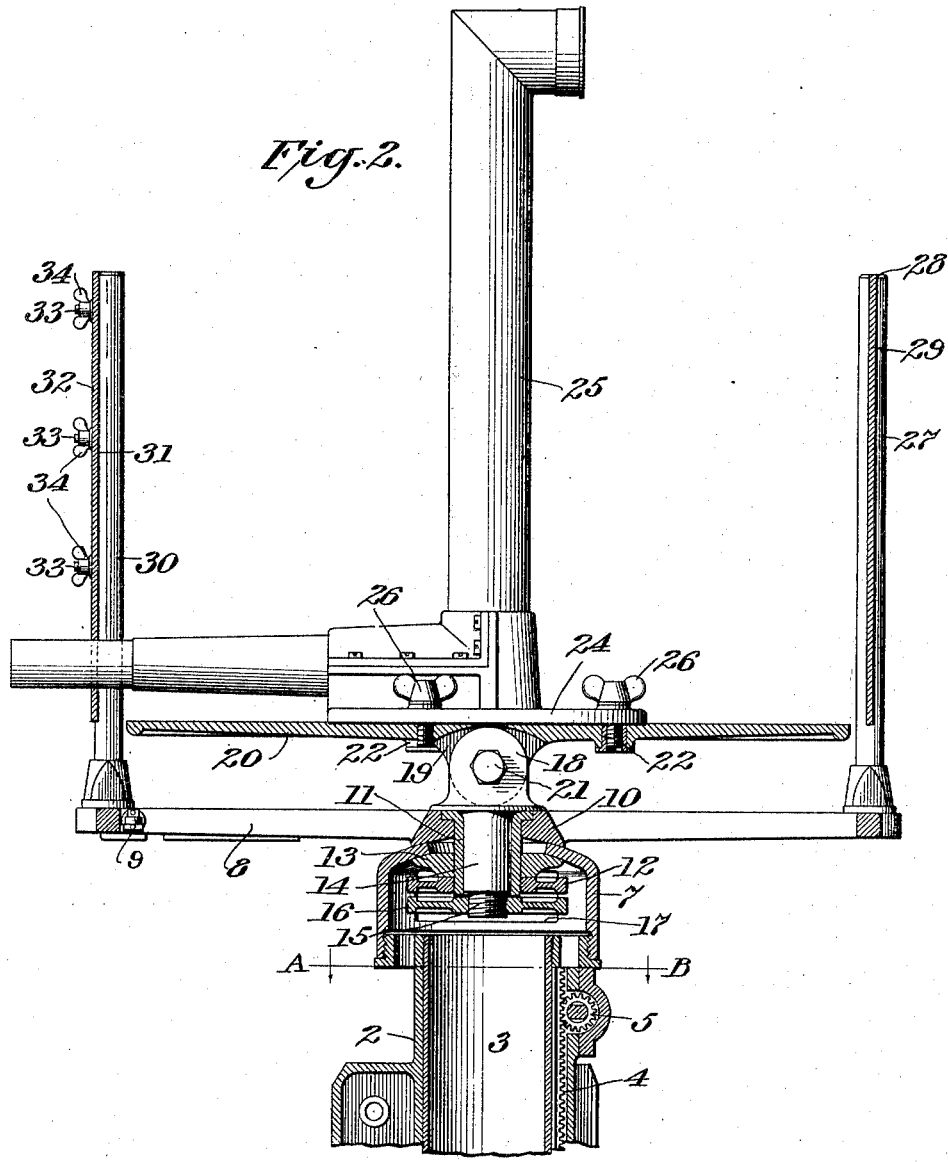
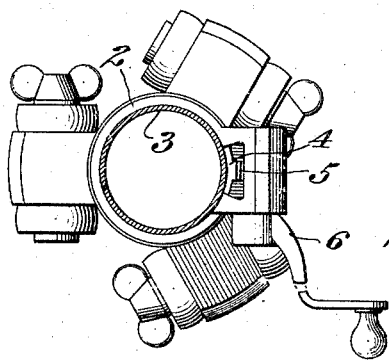

D. W. BRUNTON.
APPARATUS FOR LOCATING SNIPERS AND FOR OTHER PURPOSES.
APPLICATION FILED SEPT. 14, 1917.
1,308,474.
Patented July 1, 1919.
3 SHEETS—SHEET 3.
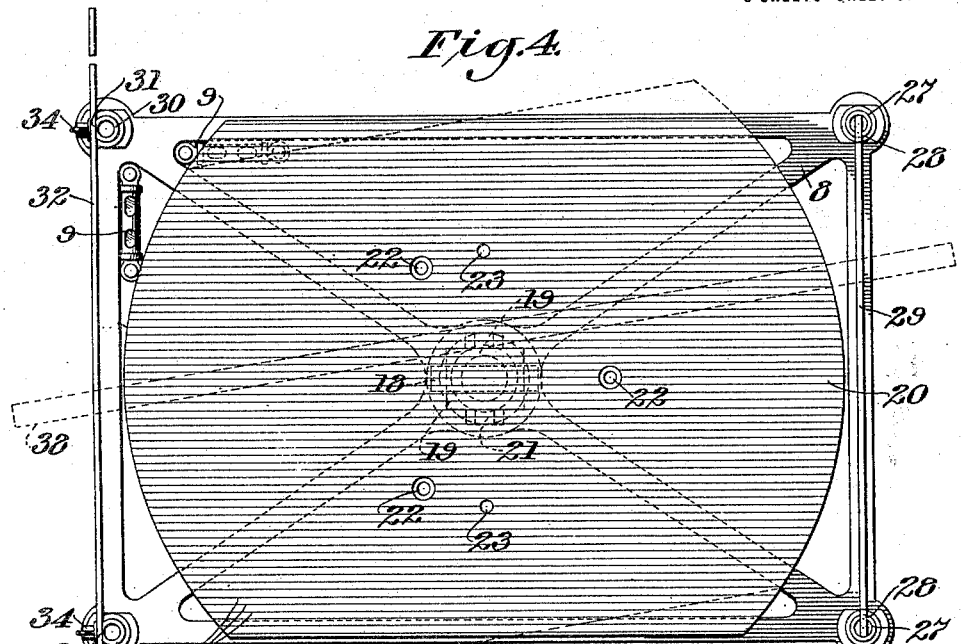
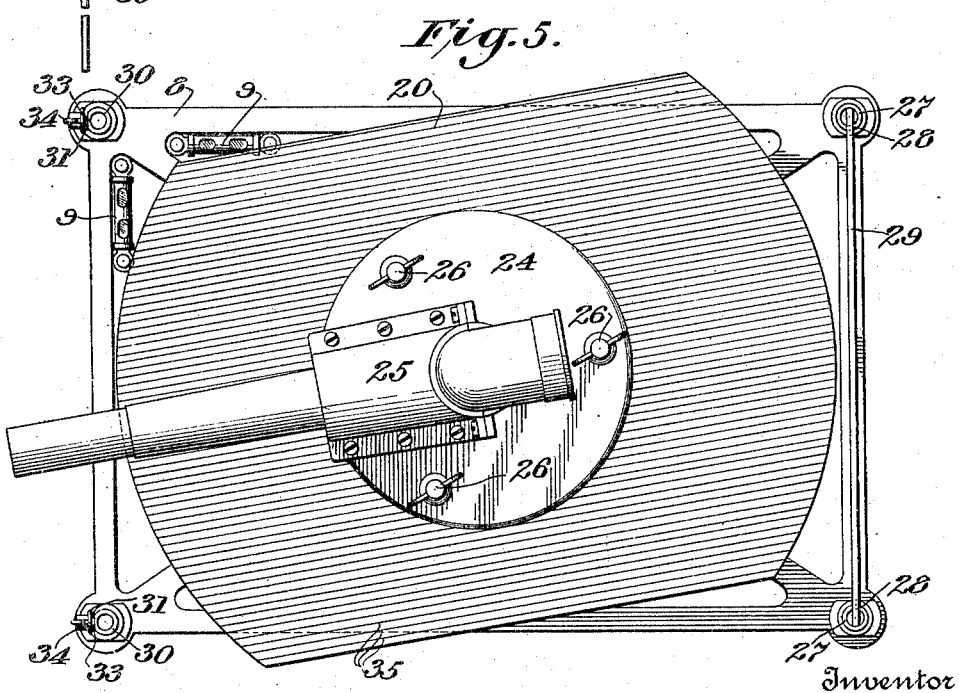

UNITED STATES PATENT OFFICE.

DAVID W. BRUNTON, OF DENVER, COLORADO.

APPARATUS FOR LOCATING SNIPERS AND FOR OTHER PURPOSES.

1,308,474. Specification of Letters Patent. Patented July 1, 1919.

Application filed September 14, 1917. Serial No. 191,465.

*To all whom it may concern:*

Be it known that I, DAVID W. BRUNTON, a citizen of the United States, residing at Denver, in the county of Denver and State of Colorado, have invented a certain new and useful Improvement in Apparatus for Locating Snipers and for other Purposes, of which the following is a full, clear, and exact description.

In modern warfare trenches or other cover are largely used for defensive purposes, and sharpshooters or "snipers", as they are sometimes called, are stationed at intervals along the line of front for the purpose of "picking off" any enemy who shows his head above the parapet of his trench. When a man is hit by a sniper, it is very difficult, and in fact well-nigh impossible, to locate the sniper, because no one knows, except in a general way, from what direction the bullet came.

The object of this invention is primarily to provide an apparatus for locating the positions of enemy snipers so that they may be dislodged and thus prevented from disabling or killing men who must necessarily at times expose themselves for taking observations and for other purposes.

Although this is the primary object of the invention, it is obvious that it may be used equally effectively for determining the direction of motion, or course, and the source of any moving object which will perforate the apparatus embodying the invention in the manner hereinafter explained.

The invention consists in a decoy or target having a pair of spaced-apart plates adapted to be exposed so as to be perforated by a bullet or the like, and then brought under cover, when by observing the alinement of the perforations so made in the plates the course and source of the bullet or other moving object may be determined; and it consists further in various features of the support for the plates and its operating and coordinated mechanism, as I will proceed now to explain and finally claim.

In the accompanying drawings illustrating the invention, in the several figures of which like parts are similarly designated, Figure 1 is a view showing my apparatus set up for operation in a military trench, the full lines illustrating the use of the invention as a decoy or target which has been hit by a bullet; the lower dotted lines showing the lowering of the device for observation of the hit, and the upper dotted lines showing the application of a trench telescope for searching the gunner. Fig. 2 is a central vertical section showing my apparatus equipped for searching purposes. Fig. 3 is a section taken on line A B, Fig. 2, and looking in the direction of the arrows. Fig. 4 is a top plan view of part of the head arranged for observation. Fig. 5 is a view similar to Fig. 4 but showing the telescope table with its telescope attached and adjusted to sighting position for searching purposes.

As illustrated in the drawings, the decoy or target is mounted upon a stand, shown as a tripod 1, which may be of any ordinary or approved construction, preferably extensible, and this tripod is provided with a head 2, specially constructed to receive and retain a vertically adjustable tubular or other post or upright 3, provided with a toothed rack 4, with which meshes a suitable pinion 5 mounted in the head 2, and operated by a crank 6 whereby the vertical adjustment of the upright may be regulated. On the upper end of the upright 3 is a leveling head 7, and on this head is mounted a support 8 made in the form of an open-work frame or spider, and provided with spirit or other levels 9, whereby the support may be adjusted to true horizontal position. The support has a bearing 10 which coöperates with the upper face of the leveling head 7, and this bearing is provided with a sleeve 11 secured therein against independent rotation and screwthreaded at its lower end and provided with a tensioning or locking nut 12, which bears against a friction member 13 which in turn coacts with the under face of the head 7, whereby when the support 8 is adjusted to true horizontal position the nut 12 may be tightened to hold it thus. Through the sleeve 11 extends a pivot 14 screwthreaded at its lower end 15, and provided with a locking or clamping nut 16. Diametrically opposite openings 17 are provided in the head 7 through which access may be had to the nuts 12 and 16 for adjustment thereof.

On the upper end of the pivot 14 is a bearing member 18 which coacts with ears 19 on the underside of the telescope table 20. A bolt or other suitable pivot 21 passing through the ears 19 and member 18 is provided, whereby angular adjustment of the telescope table with respect to the horizontal plane of the support may be obtained, rotative adjustment of the table being obtained by means of the pivot 14 and nut 16. The table 20 may be provided with any suitable means for receiving and securing a telescope or other instrument of like character, and as one such means are shown screwthreaded sockets 22 which in conjunction with pin holes 23 and complemental pins or dowels (not shown) on the under side of the base 24 of a trench or other suitable telescope 25 serve to assist in the correct positioning of the telescope upon the table, and it is secured thereon by means of thumbscrews 26, three, more or less, in number, so that the telescope can only be placed on the table in one position, for a purpose hereinafter explained.

The support 8 is provided at its four corners with posts, the two posts 27 at the front end of the support being provided with slots 28 adapted to receive and hold in position a plate or diaphragm 29 of wood, cardboard, fine wire netting, or other material of a nature suitable for the purpose. Experiments lead to the belief that a sheet of soft sugar pine about three thirty-seconds of an inch thick will give the best results because when a bullet passes through it a clean perforation is made, as contrasted with a ragged hole when some other kinds of plates are used. The posts 30 at the rear end of the support are provided with flattened portions 31 against which may be secured the plate 32, similar to the plate 29, but about twice as broad, so as to extend for a distance at both sides of the support at the rear. This plate is shown in Fig. 4 as broken out near the end at each side so as to come within the drawing sight, and it extends beyond the posts so as to obtain as wide a range of obliquity of the shot as possible. The plate 32 is held in position on the posts 30 by studs 33 and wing nuts 34, the studs passing through perforations in the plate.

The table 20 is provided on its upper face with a plurality of parallel lines or rulings 35 for a purpose hereinafter appearing.

The apparatus is used as follows:—As shown in Fig. 1, the apparatus is set up in the trench, with the decoy or target lowered so as to be wholly inside the trench, and a mask of a soldier's face 36, preferably provided with a cap 37 is attached to the plate 29. Then by turning the crank 6 the pinion 5 will act upon the rack 4 to raise the upright, and with it the support, above the parapet of the trench to the position shown in full lines in Fig. 1. To an enemy stationed at a distance from the trench the mask 36 would appear as the head of a soldier rising above the parapet of the trench, and would be a target for his fire. When the front plate or mask is struck by a bullet, the bullet will pass through the same and thence through the plate 32, and I have indicated in dotted lines at $x$ the path of such a bullet. When this occurs, the support is lowered again to a position wholly within the trench, as at $y$, and a rod 38, as shown in dotted lines in Fig. 4, is passed through the perforations in the plates 29 and 32, and then the telescope table 20 is turned upon its pivot 14 until by sighting along the edge of rod 38 the rulings 35 will be parallel therewith. In this manner the horizontal direction of the line of flight of the bullet may be ascertained, as indicated by the perforations made by it in the plates 29 and 32. Angular adjustment of the table 20 relative to the horizontal plane of the support 8 may then be made by means of the pivotal connection and the bolt 21. When both the horizontal direction of the line of flight of the bullet and its inclination with respect to the horizontal have been ascertained, and the table 20 adjusted to correspond thereto, the telescope 25 will be attached to the table and by means of its dowels or pins and the thumb-screws and the pin holes 23 and sockets 22 respectively will be positioned thereon in exact alinement with the rulings 35. When the telescope is in position, the crank 6 is again operated to raise the support, this time with the telescope attached and the plate 32 and mask 36 removed, to such height that the line of sight of the telescope will be coincident with the line of flight of the bullet, as shown in dotted line position $z$, Fig. 1. The azimuth of the sniper, except for the very slight error due to the windage, would be correct, although the elevation of the telescope crosshairs due to the trajectory of the bullet and the unknown distance it had traveled, might be a trifle out, but this would not interfere with the desired result, since with the sniper's position in azimuth fixed, there would be little or no trouble in locating his vertical position.

A large number of experiments with the apparatus have been made, and in every instance the path of the bullet gave an exact clue to its source.

If desired, the plate 29 may be removed also in order to make the device less conspicuous if it is raised above the parapet, but such removal is not necessary for observation with the telescope.

Of course, it is best to use new plates 29 and 32 every time that the plates have been perforated, but it is obvious that the same plates might be used a number of times if the holes previously made were securely plugged, or else indicated in some way, as by marking them, it being very unlikely that the apparatus would be hit in the same place twice.

In place of the face mask and cap, a face might be painted on plate 29.

Various changes in details of construction and arrangement of parts are contemplated as within the spirit of the invention and the scope of the following claims.

By the term "telescope" used herein I do not means to limit my invention to the instrument thus commonly designated, but do mean to include any optical instrument, such as a periscope or other observation or sighting instrument suitable for the purposes for which the apparatus is used or for which it is designed.

What I claim is:—

1. In an apparatus for locating snipers and for other purposes, a decoy or target having a pair of spaced-apart perforable plates adapted to be penetrated by a flying object and when so penetrated the rotation of the holes made therein serving to indicate the direction from which the object came and affording a basis for determining the location of the origin of flight, an adjustable support therefor, and means for maintaining the device against indeterminate movement.

2. In an apparatus for locating snipers and for other purposes, a decoy or target having a pair of perforable plates located one in advance of the other, the rearmost plate extending laterally beyond the foremost plate, said plates adapted to be penetrated by a flying object and when so penetrated the relation of the holes made therein serving to indicate the direction from which the object came and affording a basis for determining the location of the origin of flight, an adjustable support therefor, and means for maintaining the device against indeterminate movement.

3. In an apparatus for locating snipers and for other purposes, an adjustable decoy or target comprising a pair of spaced-apart plates adapted to be perforated by a moving object, whereby the source of motion of said object may be determined, an adjustable support therefor, and means for maintaining the device against indeterminate movement.

4. In an apparatus for locating snipers and for other purposes, a vertically adjustable decoy or target comprising a pair of plates and an adjustable support for said plates on which they are mounted at a suitable distance apart, said plates adapted to be perforated by a moving object, and means for ascertaining the alinement of the perforations produced by the moving object in said plates, whereby the source of motion of said object may be determined.

5. In an apparatus for locating snipers and for other purposes, a decoy or target comprising a pair of plates, a leveling support on which said plates are mounted at a predetermined distance apart, and means for raising and lowering said support to bring said plates into and out of the line of flight of a bullet or other object, and means for maintaining the decoy or target against indeterminate movement.

6. In an apparatus for locating snipers and for other purposes, a support, a pair of plates stationarily applied thereto and forming a decoy or target, a table adjustably mounted upon said support, means for projecting said plates to a position wherein they may be in the line of flight of a bullet or other object and be perforated thereby, and means for adjusting said table independently of the plates to correspond with the direction and inclination of the line of flight of said object as indicated by the perforations in said plates.

7. In an apparatus for locating snipers and for other purposes, a vertically adjustable support, posts on said support, a pair of plates removably mounted on said posts and by them spaced a predetermined distance apart, a table adjustably mounted upon said support independently of the plates, and a telescope adapted to be mounted on said table, said plates adapted to be exposed to perforation by a bullet or the like, whereby the direction and inclination of the path of said bullet may be determined and the telescope adjusted in coincidence with said path to thereby ascertain the source of flight of the bullet.

8. In an apparatus for locating snipers and for other purposes, adapted to be used in a military trench or other cover, a decoy or target comprising a pair of plates mounted at a suitable distance apart, one of said plates provided with a face mask or other representation of a face, means for raising said plates above the parapet of the trench so that the representation may attract a shot and the plates resultantly be perforated, and for lowering said plates to cover, and means for ascertaining the source of the shot by reference to the alinement of the perforations in said plates.

9. In an apparatus for locating snipers and for other purposes, a stand, a support mounted on an upright carried in said stand, a rack on said upright and a gear on said stand by which said support may be vertically adjusted, means for adjusting said support angularly with respect to said upright, a pair of plates carried by said support at opposite ends thereof, a table mounted on said support independently of the plates and angularly adjustable with relation thereto, and a telescope adapted to be mounted on said table, for the purpose specified.

10. In an apparatus for locating snipers and for other purposes, a stand, a support mounted on an upright carried in said stand, a rack on said upright and a gear on said stand by which said support may be vertically adjusted, means for leveling said support, a pair of plates carried by said support at opposite ends thereof, a table mounted on said support at or near the bottoms of the plates and separately therefrom and angularly adjustable with relation thereto, and a telescope adapted to be mounted on said table, for the purpose specified.

11. In an apparatus for locating snipers, a decoy or target having a pair of spaced-apart perforable diaphragms designed to attract the fire of an enemy and when struck the holes made therein serving to indicate the direction from which the fire came and affording a basis for determining the location of the enemy, distance observing means, and an adjustable support for the decoy or target correlatively mounted with respect to the decoy or target to permit visual location of the enemy as indicated by the alinement of the holes in the diaphragms.

12. In an apparatus for locating snipers and for other purposes, a decoy or target comprising a pair of plates, a support upon which said plates are mounted at a distance apart, and a table rotatably mounted on said support and angularly adjustable with relation thereto and independently of the plates.

13. In an apparatus for locating snipers and for other purposes, a decoy or target by means of which the line of flight of a bullet or the like may be indicated, a support for said decoy, and a telescope table rotatably mounted on said support at or near the bottom of the decoy or target and angularly adjustable with relation to the horizontal plane of the support.

14. In an apparatus for locating snipers and for other purposes, a decoy or target by which the line of flight of a bullet or the like may be indicated, a support for said decoy, and a telescope table rotatably mounted on said support and angularly adjustable with relation thereto independently of the decoy or target and having parallel rulings whereby it may be brought into alinement with the line of flight of the bullet or the like as indicated by the decoy.

15. In an apparatus for locating snipers and for other purposes, the combination with a decoy or target, of a rotatable and angularly adjustable telescope table provided with parallel longitudinal rulings, a telescope, and interengaging means on said table and telescope to secure said telescope on said table with its line of sight in parallelism with said rulings, and an adjustable support upon which the decoy or target and the table are independently mounted.

16. In an apparatus for locating snipers and for other purposes, the combination of decoy or target plates, a leveling support on which they are mounted, a leveling head on which said support is mounted, an adjustable tripod carrying said head, and means for maintaining the decoy or target plates against indeterminate movement in azimuth.

17. In an apparatus for locating snipers and for other purposes, the combination of decoy plates or diaphragms, a leveling support on which they are mounted, an alinement table independently mounted upon said support and adjustable with relation to the plates or diaphragms, a leveling head on which the support is mounted, and an adjustable tripod carrying said head.

In testimony whereof I have hereunto set my hand this 14th day of September, A. D. 1917.

DAVID W. BRUNTON.

Witnesses:
C. W. FOWLER,
WM. H. FINCKEL.

Copies of this patent may be obtained for five cents each, by addressing the "Commissioner of Patents, Washington, D. C."

It is hereby certified that in Letters Patent No. 1,308,474, granted July 1, 1919, upon the application of David W. Brunton, of Denver, Colorado, for an improvement in "Apparatus for Locating Snipers and for other Purposes," an error appears in the printed specification requiring correction as follows: Page 3, line 17, claim 1, for the word "rotation" read *relation;* and that the said Letters Patent should be read with this correction therein that the same may conform to the record of the case in the Patent Office.

Signed and sealed this 22d day of July, A. D., 1919.

[SEAL.]

R. F. WHITEHEAD,

*Acting Commissioner of Patents.*

Cl. 33—46.